Patented Mar. 23, 1954

2,673,223

UNITED STATES PATENT OFFICE 2,673,223

1-CYCLOALIPHATIC-2-NITROPROPENE-1 DERIVATIVES

Thomas F. Wood, Clifton, N. J., assignor to The Givaudan Corporation, New York, N. Y., a corporation of New Jersey No Drawing. Application November 29, 1951, Serial No. 258,990

3 Claims. (Cl. 260—644)

This invention relates to novel chemical substances, and more especially, to 1-cycloaliphatic derivatives of 2-nitropene-1.

These novel chemicals have the following structural formulae:

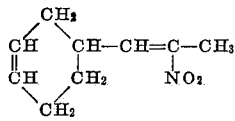

1-(1-cyclohexen-3-yl)-2-nitropropene-1, and

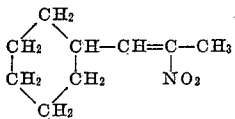

1-cyclohexyl-2-nitropropene-1.

Both compounds have characteristic olfactory properties, the former being rather pleasant in odor in spite of a somewhat lachrymatory effect, while the latter has an intense odor of dill. In addition, both compounds are intermediates in the preparation of cyclohexylacetone, a compound of interest as an odoriferous material and itself an intermediate in the preparation of physiologically active compounds of value in medicine.

In order to illustrate this invention more fully but without thereby limiting it, the following examples are given.

EXAMPLE 1

PREPARATION OF 1-(1-CYCLOHEXEN-3-YL)-2-NITROPROPENE (a) *1-cyclohexen-3-yl-2-nitropropanol-1*

Into a 2-liter flask provided with agitator, thermometer and feed funnel was charged, 220 g. 1,2,5,6-tetrahydrobenzaldehyde (2 moles), 300 g. commercial nitroethane (4 moles) (Commercial Solvents Corp.) and 300 g. methanol. The resulting solution was cooled to 17° and there was added gradually over a 30 minute period 8 g. sodium hydroxide, 16 g. water, 60 g. methanol. The reaction was mildly exothermic and cooling was applied so that the temperature was kept at 15–20° during the feeding. The solution was stirred for 6 hrs. at 15–20° then cooled to 15° and the solution neutralized with a solution of 14 g. glacial acetic acid in 100 ml. water with good stirring. The reaction mixture was poured into 400 ml. of water and shaken well. The mixture was settled and the bottom oil layer (527 g.) separated. This was washed with 250 ml. water saturated with salt. The separated oil (518.5 g.) was distilled to a pot temperature of 100° first at slightly reduced pressure and finally at 2 mm. for recovery of excess nitromethane and unreacted tetrahydrobenzaldehyde. The residue was a light brown viscous oil amounting to 280.5 g. This was the 1-cyclohexen-3-yl-2-nitropropanol-1 (yield 76% of theory).

(b) *Acetate of 1-cyclohexen-3-yl-2-nitropropanol-1*

Into a solution of 192 g. acetic anhydride (1.854 moles) containing 1.7 g. of 93% sulfuric acid and heated to 60° there was fed slowly with good stirring 280.5 g. of crude 1-cyclohexen-3-yl-2-nitropropanol-1 over a 40 minute period. The temperature was maintained at 60° by cooling during the feeding period. The reaction was somewhat exothermic. The mixture was stirred for 30 minutes at 60° after the addition was complete. The crude acetylation mixture was diluted with 500 g. benzol and washed with 1-liter of water and 300 ml. of 5% sodium bicarbonate solution.

(c) *1-(1-cyclohexen-3-yl)-2-nitropropene-1*

Into a 2-liter flask provided with stirrer, reflux condenser and water separator there was charged the benzol solution of the nitroalcohol acetate prepared above and 106 g. soda ash (1 mole). The mixture was refluxed and stirred with separation of water. After 5 hrs. there was separated 24 ml. of water. The mixture was cooled to 50° and there was added 600 ml. warm water. The mixture was agitated and settled. After separation of the aqueous layer, the benzol solution was washed again with water containing a few drops of acetic acid (to facilitate separation). The benzol was distilled off first at atmospheric pressure and finally under reduced pressure. The liquid residue was vacuum-distilled. The product, B. P. 92–94° (1.5 mm.), sp. gr. 25°/25° 1.0701, $n_D^{20}$ 1.5165 was bright yellow liquid having a sharp but not unpleasant odor. The yield (219.5 g.) was 86.8% of theory calculated on the crude nitro-alcohol used (280.5 g.).

*Anal.*—Calcd. for $C_9H_{13}O_2N$: N, 8.38. Found: N, 8.20.

EXAMPLE 2

PREPARATION OF 1-CYCLOHEXYL-2-NITROPROPENE-1

(a) *1-cyclohexyl-2-nitropropanol-1*

Into a 3-liter flask provided with agitator, thermometer and feed funnel was charged, 327 g. hexahydrobenzaldehyde (2.9 moles), 435 g. commercial nitroethane (5.8 moles) (Commercial Solvents Corp.) and 435 g. methanol. The resulting solution was cooled to 17° and there was added dropwise over a 30 minute period a solution of 11.5 sodium hydroxide, 16 g. water and 83 g. methanol. The reaction was mildly exothermic and cooling was applied so that the temperature was kept at 15–20° during the feeding. The solution was stirred for 4 hrs. at 15–20°, then cooled to 15° and the solution neutralized by careful addition of a solution of 20.5 g. glacial acetic acid and 81.5 g. water. The reaction mixture was poured into 800 ml. water and shaken. The mixture was settled and the bottom oil layer separated. This was washed with 500 cc. of saturated salt solution. The oil which was separated (793.5 g.) was distilled to a pot temperature of 110° first at slightly reduced pressure and finally at 2 mm. for recovery of excess nitroethane and unreacted hexahydrobenzaldehyde. The residue was a light brown viscous oil amounting to 474.5 g. This was the 1-cyclohexyl-2-nitropropanol-1. The yield of crude nitroalcohol was 87.7% of theory.

(b) *Acetate of 1-cyclohexyl-2-nitropropanol-1*

Into a solution of 322 g. acetic anhydride (3.16 moles) containing 2.9 g. of 93% sulfuric acid and heated to 60° there was fed in slowly with good stirring, 474.5 g. of crude 1-cyclohexyl-2-nitropropanol-1 over a 45 minute period. The temperature was maintained at 60° by occasional cooling during the feeding period. The reaction was somewhat exothermic. The mixture was stirred for 30 minutes at 60° after the addition was complete. The crude acetylation mixture was diluted with 1,000 ml. benzene and washed with 1,500 ml. water and finally with 300 ml. of 5% sodium bicarbonate solution. The benzene was removed by distillation, first at atmospheric pressure and finally at reduced pressure. The liquid residue was vacuum-distilled yielding 541 g. (81.4% of theory) of colorless liquid, B. P. 115–120° (1.5 mm.), the acetate of 1-cyclohexyl-2-nitropropanol-1.

(c) *1-cyclohexyl-2-nitropropene-1*

Into a 3-liter flask provided with stirrer, reflux condenser and water separator there was charged 469 g. of the acetate of 1-cyclohexyl-2-nitropene-1, (2.04 moles), 670 g. of benzene and 284 g. soda ash (2.68 moles). The mixture was stirred and refluxed with separation of water. After 5 hrs. there was separated 31 ml. of water. The mixture was cooled to 50° and there was added 600 g. water. The mixture was stirred and settled. After separation of the aqueous layer, the benzene solution was washed again with water containing a few drops of acetic acid (to facilitate separation). The benzene was distilled off first at atmospheric pressure and finally under reduced pressure. The liquid residue remaining was vacuum distilled at low pressure yielding 271 g. of pale yellow heavy liquid, B. P. 95–97° (2 mm.), sp. gr. 20°/25° 1.0351, $n_D^{20}$ 1.5004, %N=8.20 (calc'd. 8.28), having a sharp but rather pleasant odor which in dilution has an intense odor of dill ("dilweed oil").

The foregoing illustrates the practice of this invention, which however, is not to be limited thereby but is to be construed as broadly as permissible in view of the prior art and limited solely by the appended claims.

I claim:
1. As novel chemical compounds, substances selected from the group consisting of 1-(1-cyclohexen-3-yl)-2-nitropropene-1 and 1-cyclohexyl-2-nitropropene-1.
2. 1-(1-cyclohexen-3-yl)-2-nitropropene-1.
3. 1-cyclohexyl-2-nitropropene-1.

THOMAS F. WOOD.

References Cited in the file of this patent
UNITED STATES PATENTS

| Number | Name | Date |
|---|---|---|
| 2,335,384 | Bousquet et al. | Nov. 30, 1943 |
| 2,408,607 | Buckley | Oct. 1, 1946 |